Patented Mar. 2, 1937

2,072,739

UNITED STATES PATENT OFFICE 2,072,739

ESTERS

Harry Ben Dykstra, Wilmington, Del., and Walter Eastby Lawson, Woodbury, N. J., assignors to E. I. du Pont de Nemours & Company, Wilmington, Del., a corporation of Delaware No Drawing. Application October 24, 1934, Serial No. 749,762

11 Claims. (Cl. 260—103)

This invention relates to esters of aromatic polycarboxylic acids.

This case is a continuation in part of application Serial No. 395,739, filed September 27, 1929, (U. S. P. 1,975,087), and of application Serial No. 719,292, filed April 6, 1934.

This invention has as an object the preparation of esters of dibasic acids, said dibasic acids being derivable by the action of dibasic acids on hydroxy carboxylic acids. A further object is the preparation of organic plastic compositions comprising cellulose derivatives and esters of the above described acids. A still further object is the preparation of the esters themselves. Other objects will appear hereinafter.

These objects are accomplished by the following invention, wherein an ester of a dicarboxylic acid such as phthalyl glycollic acid is prepared.

It has been found that esters of phthalyglycollic acid may be prepared by reacting esters of glycollic acid with phthalic anhydride followed by esterification of the remaining carboxyl group with another alcohol or another mol. of glycollic ester. These esters may also be prepared by reacting esters of chloroacetic acid with alkali metal salts of alkyl acid phthalates. It has also been found that these esters and their analogs, as described below, are useful in the preparation of plastic compositions.

Having outlined above the general purposes of the invention, the following applications of the general principle thereof to certain specific instances are included for purposes of illustration and not in limitation.

EXAMPLE 1

A mixture of 120 g. polymerized vinyl chloroacetate, 244 g. of sodium butyl phthalate, and 800 g. of the acetate of ethylene glycol mono-ethyl ether was heated with constant stirring for 7 hours at 150° C. the reaction mixture was filtered and the solvent removed from the filtrate by vacuum distillation giving 280 g. of light-colored resin which contained 1.5% chlorine. The resin was soluble in aromatic hydrocarbon and compatible with pyroxylin, differing in this respect from polymerized vinyl chloroacetate, and its mixture air dried quickly to give hard and tough finishes.

EXAMPLE 2

*Butyl phthalyl vinyl glycollate.*—A mixture containing 30 g. vinyl chloroacetate, 61 g. sodium butyl phthalate, and 100 g. toluene was refluxed gently for 2 hours in an oil bath. The reaction mixture was washed with water, then the toluene layer was separated, dried and distilled until the temperature reached 120° C. The mixture was filtered again and then distilled under reduced pressure, when a product boiling at 220° to 245° C. at 20 mm. pressure was obtained. This material was butyl phthalyl vinyl glycollate.

EXAMPLE 3

*Methoxyethyl phthalyl methyl glycollate.*—A mixture containing 148 g. phthalic anhydride, 90 g. methyl glycollate, and 200 g. ethylene dichloride was heated at 100° for 9 hours. Seventy-six g. methoxyethanol and 2 g. sulfuric acid was then added and the mixture distilled in an apparatus designed to separate the water from the distillate, and return ethylene dichloride to the reaction vessel. After heating for 14 hours the mixture was washed with water containing sodium carbonate to remove the sulfuric acid and unreacted phthalic acid. The product was refined by heating to 135° C. at 50 mm. pressure to remove all volatile material. The product was then treated with decolorizing carbon and filtered.

EXAMPLE 4

*Methyl phthalyl methyl glycollate.*—A mixture containing 740 g. phthalic anhydride and 1000 g. methanol was refluxed until the acid number indicated the formation of methyl acid phthalate. This material was neutralized by adding a solution of 280 g. potassium hydroxide in 1000 g. methanol. The resulting solution was filtered to remove dipotassium phthalate. Five hundred forty g. methyl monochloroacetate was added to this solution and heated to boiling under a reflux condenser for 6 hours. During this time large quantities of salt precipitated out of this solution. The salt was filtered off and the alcohol distilled. The remaining product was washed with water and then heated to 130° C. under 50 mm. vacuum to remove volatile materials. The resulting product was treated with decolorizing carbon and filtered. The saponification number indicated that this material was substantially pure methyl phthalyl methyl glycollate.

EXAMPLE 5

*Cyclohexyl phthalyl cyclohexyl glycollate.*—Two gram molecular weights of potassium cyclohexyl phthalate in 800 cc. of ethyl alcohol was treated with 2 gram molecular weights cyclohexyl chloroacetate and the mixture refluxed for 15 hours. This product was purified as described in Example 4.

EXAMPLE 6

*Dodecyl phthalyl dodecyl glycollate.*—Potassium dodecyl phthalate was prepared by reacting potassium hydroxide in ethyl alcohol with mono-dodecyl phthalate in alcohol. The resulting product was treated with an equivalent weight of dodecyl monochloroacetate and refluxed for 10 to 12 hours. The product was purified as in Example 4.

EXAMPLE 7

*Isobutyl phthalyl isobutyl glycollate.*—This product was prepared in the manner identical with that described in previous examples.

Other esters prepared by this same method include methoxyethyl phthalyl methoxyethyl glycollate and propyl phthalyl propyl glycollate.

EXAMPLE 8

*Methyl alpha (methyl phthalyloxy) isobutyrate.*—Two gram molecular weights potassium methyl phthalate in methyl alcohol was treated with 2 gram molecular weights methyl alpha chloro-isobutyrate and the mixture refluxed for 40 hours. The resulting product was purified as described in previous examples.

In a similar manner esters of phthalyllactic acid may be prepared by using esters of alpha chloropropionic acid. Esters of phthalyllactic acid may likewise be prepared by a process similar to that of Example 3 from esters of lactic acid. Esters may likewise be prepared by reacting dipotassium phthalate with esters of chloroacetic acid esters but this method is not as satisfactory as the methods above described. Other esters for example, esters of adipyl glycollic acid may also be prepared, but these compounds likewise are not as readily prepared as those above described because of the difficulty of making a pure half ester of adipic acid. Esters from polyhydric alcohols may be prepared. Thus, ethylene glycol di-mono-chloroacetate may be reacted with potassium butyl phthalate to give bis- (butyl phthalyl) glycol glycollate. The esters may be conveniently formulated as follows:

$$R^1—O—CO—R^2—CO—O—R^3—CO—O—R^4,$$

wherein $R^1$ and $R^4$ are monovalent radicals derived from an aliphatic, aromatic or cyclo-paraffinic alcohol $R^1$ and $R^4$ thus include monovalent radicals derived from an aliphatic, aromatic, or cycloparaffinic ether alcohol. $R^2$ is a divalent organic radical, and $R^3$ a divalent aliphatic hydrocarbon radical. Thus, $R_1$ may be butyl, methoxyethyl, methyl, cyclohexyl, dodecyl, isobutyl, and propyl as disclosed in the above examples, as well as ethyl, benzyl, etc. $R^2$ may be furnished by dicarboxylic acids other than phthalic or adipic, for example 4-chlorophthalic, 3-nitrophthalic, succinic, maleic, sebacic, glutaric, malic, and suberic. The dicarboxylic acid entering into the molecule of the plasticizer esters of this invention is preferably taken from the group of phthalic, maleic, succinic, and derivatives thereof, since these acids readily form intramolecular anhydrides and render the formation of the half ester more convenient. The radical $R^3$ may be supplied by various acids other than the glycollic, lactic, and alpha hydroxyisobutyric acids of the above example. Thus, alpha, beta or gamma hydroxy normal butyric and hydracrylic acids may be employed. $R^4$ may be furnished by various alcohols or alcohol derivatives such as vinyl, methyl, cyclohexyl, dodecyl, isobutyl, propyl, methoxyethyl, tetrahydrofurfuryl, ethyl, benzyl, etc., alcohols, glycol, etc.

The esters are substantially non-volatile and have been found to be satisfactory plasticizers for cellulose derivatives and natural and synthetic resins of the type containing a plurality of ester and/or ether linkages. The resins with which these new plasticizing esters may be used include polymerized vinyl acetate, polymerized methyl methacrylic, polyhydric alcohol-polybasic acid resins, phenolaldehyde resins, modified phenol aldehyde resins, and many natural resins such as damar, pontianac, sandarac, kauri, shellac, etc., and their derivatives, e. g., ester gum, hydrogenated rosin, and hydrogenated ester gum.

The above examples indicate that in general any alcohol may be used to esterify the chloroacetic acid or phthalic acid, or the equivalents of these. Different alcohols may also be used for the formation of mixed esters.

It is to be noted that most of the organic plastic substances plasticized by the esters of the present invention have this in common, that they are highly polymeric materials, resinous or quasi-resinous in nature, and having a plurality of C—O—C linkages either in the form of ester linkages or ether linkages. While the cause for the plasticizing power is not as yet known, the presence of a plurality of C—O—C linkages in the material to be plasticized and of a plurality of C—O—C linkages in the plasticizing material may have some bearing on the plasticizing property of the latter.

The derivatives of the present invention may be used in the preparation of various types of compositions containing cellulose derivatives and/or natural and synthetic resins, oils and filling materials. Thus, they may be used in the preparation of lacquers and enamels for coating metal, wood and paper, in dopes for coating fabrics, in moisture-proof lacquers for coating regenerated cellulose, in plastic compositions to be used in the preparation of toilet-ware, novelties, sheeting, rods, tubes, safety-glass interlayers, etc., in lacquers for coating wire screens, and in the preparation of thin sheets for wrapping purposes.

The plasticizers of the present invention are of great utility because of their very high boiling point, and great water resistance. They are highly compatible with cellulose derivatives and the natural and synthetic resins described, and due to their low vapor pressure, give permanently flexible products.

The above description and examples are intended to be illustrative only. Any modification of or variation therefrom which conforms to the spirit of the invention is intended to be included within the scope of the claims.

We claim:

1. As new compounds, esters of the formula:

$$R^1—O—CO—R^2—CO—O—R^3—CO—O—R^4$$

wherein $R^1$ and $R^4$ are different monovalent open chain radicals from the class consisting of open chain hydrocarbon radicals and alkoxysubstituted open chain hydrocarbon radicals, and one is an alkyl radical, $R^2$ is a divalent aromatic hydrocarbon radical, and $R^3$ is a divalent aliphatic hydrocarbon radical.

2. As new compounds, esters of the formula:

$$R^1—O—CO—R^2—CO—O—R^3—CO—O—R^4$$

wherein $R^1$ and $R^4$ are different monovalent open chain hydrocarbon radicals, one of which is an alkyl radical, $R^2$ is a divalent aromatic hydrocarbon radical, and $R^3$ is a divalent aliphatic hydrocarbon radical.

3. As new compounds, esters of phthalylglycollic acid

wherein the hydrogens of the carboxyl groups are replaced by different open chain hydrocarbon radicals, one of which is an alkyl radical.

4. As new compounds, butyl esters of phthalylglycollic acid

wherein the hydrogen of the other carboxyl group is replaced by a different open chain hydrocarbon radical.

5. Butyl phthalyl vinyl glycollate.

6. Process of preparing esters which comprises reacting vinyl chloroacetate with sodium butyl phthalate.

7. Process of preparing esters which comprises reacting a salt of a monoalkyl ester of phthalic acid with an ester wherein the carboxyl hydrogen of a halogenated aliphatic carboxylic acid is replaced by an open chain hydrocarbon radical different from that of the phthalate ester.

8. Process of preparing esters which comprises reacting a salt of a monoalkyl ester of an aromatic dicarboxylic acid with an ester wherein the carboxyl hydrogen of a halogenated aliphatic carboxylic acid is replaced by an open chain hydrocarbon radical different from that of the dicarboxylic acid ester.

9. Process of preparing esters which comprises reacting a salt of a monoalkyl ester of an aromatic polycarboxylic acid with an ester wherein the carboxyl hydrogen of a halogenated aliphatic carboxylic acid is replaced by an open chain hydrocarbon radical different from that of the polycarboxylic acid ester.

10. An ester of phthalylglycollic acid wherein the hydrogen of one carboxyl group is replaced by a saturated aliphatic hydrocarbon radical of the formula $C_nH_{2n+1}$ and the hydrogen atom of the other carboxyl group is replaced by a different open chain hydrocarbon radical.

11. An ester of a phthalyloxyaliphatic acid, $HO_2C-C_6H_4-CO_2-C_nH_{2n}-CO_2H$, wherein the hydrogen atom of one carboxyl group is replaced by a saturated aliphatic hydrocarbon radical of the formula $C_nH_{2n+1}$ and the hydrogen atom of the other carboxyl group is replaced by a different open chain hydrocarbon radical.

HARRY BEN DYKSTRA.
WALTER EASTBY LAWSON.